United States Patent Office 3,288,049
Patented Nov. 29, 1966

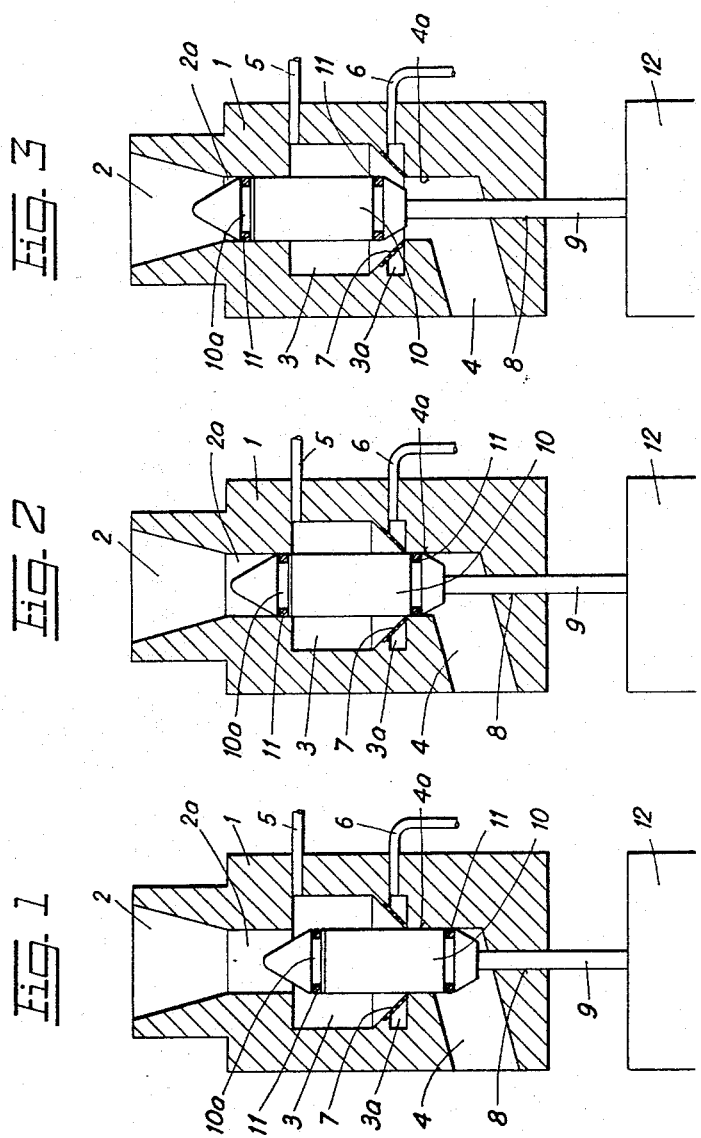

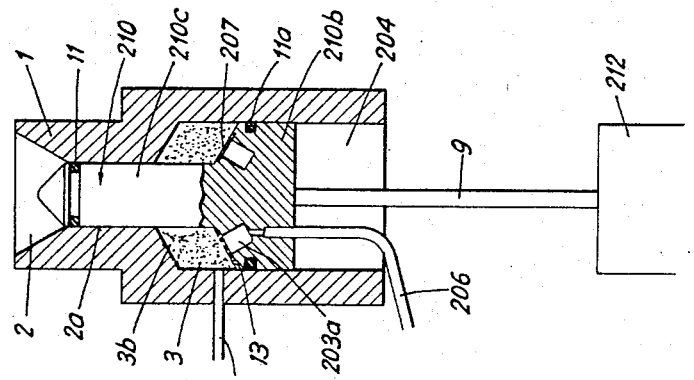
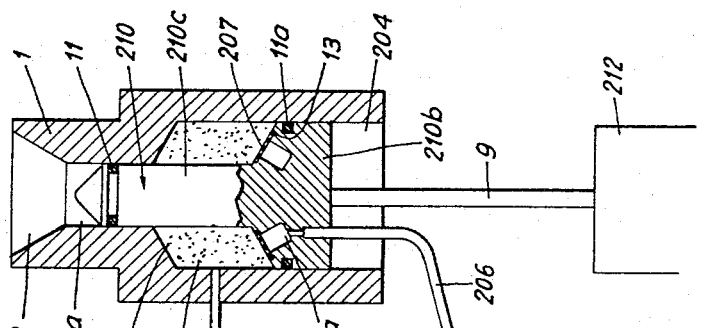
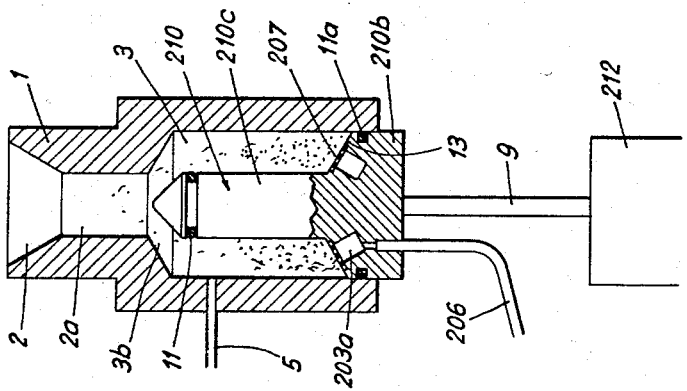

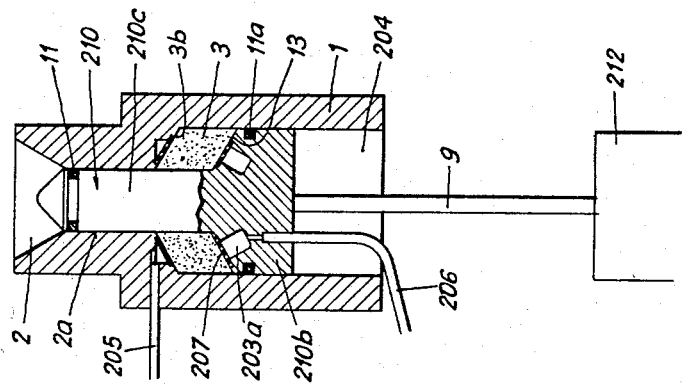
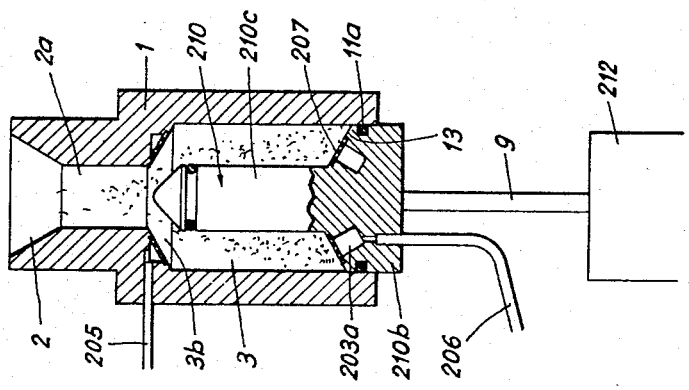
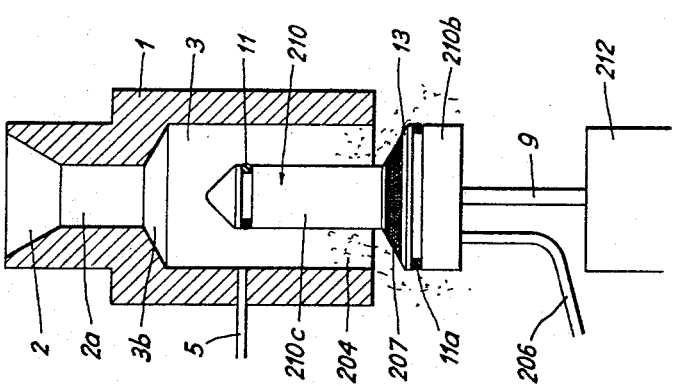

3,288,049
INFUSOR-TYPE COFFEE APPARATUS
Heinrich Schmid and Meinrad Huber, both of Dietikon, Switzerland, assignors to Paliz A.G., Zug, Switzerland
Filed May 5, 1964, Ser. No. 364,978
Claims priority, application Switzerland, May 17, 1963, 6,222/63; Jan. 8, 1964, 167/64; Apr. 9, 1964, 4,510/64
5 Claims. (Cl. 99—289)

The present invention relates to an infusor-type coffee apparatus comprising a stationary scalding chamber and a stationary filter; into which chamber enter a scalding-water line, a coffee outlet line and a discharge line.

Coffee apparatus of the type indicated are known per se, i.e. apparatus in which the stagewise operation— which consists in moving either a vessel containing the coffee powder, or else the scalding chamber from one point of infusion to the other—is avoided.

In these known coffee apparatus is provided a horizontal filter tube in which the coffee-powder by means of a piston is moved into and from the scalding chamber respectively. Marked disadvantages of such known construction were the necessary arrangement of said piston and the appropriate control means, and the fact that the coffee inlet opening had to be positioned beside the scalding chamber, which led to a complicated construction that required much space; quite apart from the fact that for reasons and considerations of taste the transport of coffee-powder within a coffee apparatus has to be avoided.

The problem underlying the present invention was to provide a simple and space-saving construction in which a special transport of the coffee-powder from the point of fill into the scalding chamber may be dispensed with.

The coffee apparatus disclosed by the present invention is characterized in that also a duct for feeding the coffee-powder opens freely into the scalding chamber, and the stationary filter covers the coffee outlet line.

Two forms of the invention including two variants of the second form are shown in the drawings, in which FIGS. 1 to 3 schematically show a section through the scalding chamber of the first form in the three operating positions of the control member;

FIGS. 4 to 7 each shows a section through the scalding chamber of a first variant of the second form, and FIGS. 8 and 9 show corresponding views of the second variant of the same form of the invention.

Corresponding parts and members in the two forms shown and in the variants have like reference characters.

In the variant shown in FIGS. 1 to 3, the scalding-chamber body 1 comprises on its upper side a filler neck 2 for the coffee-powder, which neck opens into the substantially cylindrical scalding chamber 3 through the cylindrical duct 2a for feeding the coffee-powder. A passage 4a is coaxial to duct 2a and scalding chamber 3 and extends from the scalding-chamber bottom. Chamber 3 may be drained through said line 4a and the angularly adjoining outlet 4. The scalding-water line 5 opens into chamber 3 at the top thereof, while the outlet line 6 for coffee ready for consumption leaves chamber 3 at the bottom thereof. Line 6 starts from an annular duct 3a of chamber 3 which is covered by the frusto-conical filter 7 that is secured to body 1 and is coaxial with body 1, neck 2 and passage 4a.

In a bore 8, that is coaxial to body 1, is mounted axially movably the control rod 9 for a valve tappet 10 which is guided in filler neck 2a and/or in the discharge line 4a depending on its position relatively to chamber 3.

Valve tappet 10 is of greater diameter than control rod 9 and comprises two sealing members 11 spaced axially from each other and being formed as O-rings and inserted in corresponding grooves 10a of tappet 10, the spacing between the two members 11 being slightly greater than the height of chamber 3.

Control rod 9 fundamentally may be actuated as desired, for example hydraulically, pneumatically, magnetically or mechanically. The control assembly is schematically designated by 12.

The following mode of operation follows from the structure described above. In the first position of the control member (FIG. 1) tappet 10 is depressed, i.e. duct 2a is open and communicates with chamber 3, while discharge passage 4a is shut off. In this position, chamber 3 is charged with coffee-powder via neck 2 and duct 2a. The control member 9, 10 then is raised to the position shown in FIG. 2 in which duct 2a as well as passage 4a are closed. In this position and in a manner not further shown, the scalding water is admitted into chamber 3 under pressure and passes through the coffee-powder and filter 7 and leaves the chamber in the form of coffee ready for consumption through annular duct 3a and outlet line 6. Control member 9, 10 then is raised to the position shown in FIG. 3 in which duct 2a remains closed while outlet 4 is opened. In a manner not further shown, cleaning or scavenging water is introduced into chamber 3 and leaves same again through passage 4a and outlet 4, simultaneously rinsing away the coffee-grounds accumulated on filter 7. When control member 10 is again withdrawn to its initial position (FIG. 1) the coffee-preparation cycle may start anew.

From the description given above it follows that the steps of filling in the coffee-powder, preparing the coffee, and scavenging or rinsing the scalding chamber may be carried out in a very narrow space and without exposing the sealing elements to any excessive stress.

In coffee apparatus of this type known so far, the pressure required for passing the scalding water through the coffee-powder is produced by the scalding water itself. The consequence is that the chamber always had to be filled entirely with scalding water so that the quantity of coffee to be produced always is substantially equal to the volume of the scalding chamber, i.e. said volume has to be adapted to the maximum coffee quantity to be produced per scalding process. If it is desired to take smaller quantities of coffee from such known coffee apparatus, the scalding chamber has to be partially drained only which has the essential disadvantage that the remaining quantity of liquid coffee does no longer meet the requirements and thus is lost.

If provision shall be made to take out from a coffee apparatus also smaller quantities than the scalding-chamber contents without running the risk of obtaining a deterioration of the coffee quality nor a loss of coffee powder, this advantageously is done by a further form of the invention shown in FIGS. 4 to 9.

The form of the invention shown in FIGS. 4 to 9 has the additional advantage that coffee liquid of a very uniform quality may be scalded.

In the case of the variant according to FIGS. 4 to 7 of the second form, again a scalding-chamber body is provided which on its upper side is provided with a filler neck 2 for the coffee-powder. Adjoining neck 2 is the cylindrical coffee-powder passage 2a that opens into the substantially cylindrical scalding chamber 3. At the mouth of passage 2a chamber 3 comprises a frusto-conical portion 3b while it is open on the opposite side to form the outlet 204. Approximately in the middle of chamber 3 is situated the inlet port of the scalding or scavenging-water line 5.

The valve tappet 210 is movably disposed on the axis of body 1, subjected to the control of an assembly 212, a gasket 11a assuring a tight seal between the outside of tappet 210 and the inside of chamber 3.

Valve tappet 210 comprises a piston member 210b and a bolt member 210c which latter is destined in the closing position (FIGS. 5 and 6) to enter into passage 2a and close same by means of gasket 11. Piston member 210b comprises an inclined shoulder 13 corresponding to the inclined chamber-portion 3b, on which is disposed the filter 207 which covers the annular duct 203a, the discharge line 206 leading from said duct 203a to the delivery point which is not shown. Piston member 210b is engaged by the control rod 9 which transmits the control movements from assembly 212 on to valve tappet 210.

To operate the coffee apparatus according to this variant, a certain quantity of coffee-powder is passed through neck 2 into chamber 3 in the position shown in FIG. 4, i.e. when valve tappet 210 is lowered and passage 2a is open. Tappet 210 then is raised through assembly 212 to the scalding position shown in FIG. 5 in which through control means (not shown) a quantity of the scalding water corresponding to the quantity of liquid coffee to be produced is supplied into the scalding chamber through line 5. When continuing to raise valve tappet 210 to the position shown in FIG. 6, the scalded coffee is mechanically pressed out through filter 207 and coffee outlet line 206, line 5 being closed by a valve not shown. Valve tappet 210 then is lowered to the scavenging position shown in FIGS. 7 and cleaning water is fed into chamber 3, through line 5, which water flows out again from chamber 3 through the lower and open end 204 thereof while flooding the filter 207. The operating cycle then starts again.

The second variant according to FIGS. 8 and 9 constructionally differs only slightly from the variant shown in FIGS. 4 to 7, but allows another scalding process to be carried out. The constructional difference is that the scalding and scavenging line 205 opens into the shouldered chamber portion 3b. Filling in the coffee powder is carried out as described in connection with the first variant in that the valve tappet according to FIG. 8 is lowered until the mouth of the coffee-powder feed duct is open. Valve tappet 210 then is moved to its topmost position according to FIG. 9 in which on one hand the valve stem 210c for the purpose of closing the coffee-powder feed duct enters the latter and, on the other hand, the coffee-powder is forced by the sloping shoulder 13 against the shoulder 3b and thus compressed without changing the valve-tappet position, scalding water then is introduced under pressure through line 205 into chamber 3 and forced through the compressed coffee-powder whereby—as in the first variant—the coffee liquid leaves the chamber through filter 207, annular duct 203a and finally through outlet line 206. Chamber 3 is scavenged in the manner known from FIG. 11 by lowering valve tappet 210 to clear the lower open end of chamber 3, to its lowermost position and feeding the scavenging water into chamber 3 through line 205, which water leaves chamber 3 through the open chamber end 204.

As to the exit of the liquid coffee it would be possible to dispose the coffee outlet line in the lateral scalding-chamber wall so that it will communicate in the valve-tappet position shown with annular duct 203a or with an intermediate line extending from said duct to the exterior wall of piston portion 210b.

Finally, it would be possible to discharge the liquid coffee from annular duct 203a axially through control rod 9.

The variants of the second form of the invention described and shown provide an extremely simple coffee apparatus in which resides the additional possibility of obtaining a coffee drink of uniform quality by mechanically forcing the coffee from the scalding chamber and also by compressing the coffee-powder in the chamber prior to the step of scalding same.

We claim:
1. A coffee brewing machine comprising a stationary brewing chamber having a brewing water inlet and a liquid coffee outlet connected thereto, a coffee powder feeding orifice in the top of the chamber and a discharge orifice in the bottom of the chamber, said orifices being coaxial, and a single valve member movable coaxially through the two orifices for controlling flow through both orifices.

2. A coffee brewing machine according to claim 1 wherein the brewing chamber is coaxial with the coffee powder feeding orifice and is larger in diameter than such orifice and is open at the bottom, and the valve member is in the form of a piston slidably fitting in the chamber and having an axial projection capable of slidably fitting in such orifice.

3. A coffee brewing machine according to claim 2 wherein the liquid coffee outlet is arranged in the shoulder of the piston beside the projection.

4. A coffee brewing machine according to claim 2 wherein the brewing water inlet is arranged in the shoulder of the brewing chamber beside the coffee powder feeding orifice.

5. A coffee brewing machine according to claim 4 wherein the brewing water inlet is adapted to serve also as a rinsing water inlet.

References Cited by the Examiner
UNITED STATES PATENTS

| | | | |
|---|---|---|---|
| 2,730,034 | 1/1956 | Svendsgaard | 99—289 X |
| 2,807,393 | 9/1957 | Metrailer et al. | 222—453 X |
| 2,907,266 | 10/1959 | Moulden | 99—289 |
| 2,935,011 | 5/1960 | Perlman | 99—283 |
| 3,038,492 | 6/1962 | Suggs et al. | 99—289 X |
| 3,064,553 | 11/1962 | Simjian | 99—289 |
| 3,128,915 | 4/1964 | Matter | 222—453 X |
| 3,203,340 | 8/1965 | Totten | 99—289 |

WALTER A. SCHEEL, *Primary Examiner.*

S. P. FISHER, *Assistant Examiner.*